United States Patent [19]

Nimmersjö

[11] Patent Number: 5,572,138
[45] Date of Patent: Nov. 5, 1996

[54] METHOD AND DEVICE FOR DETERMINING THE DIRECTION TO A FAULT ON A POWER TRANSMISSION LINE

[75] Inventor: Gunnar Nimmersjö, Västerås, Sweden

[73] Assignee: Asea Brown Boveri AB, Västerås, Sweden

[21] Appl. No.: 356,539

[22] Filed: Dec. 15, 1994

[30] Foreign Application Priority Data

Jan. 3, 1994 [SE] Sweden .................................. 9400009

[51] Int. Cl.⁶ ............................ G01R 31/02; H02H 3/38; H04B 3/46
[52] U.S. Cl. ............................ 324/522; 324/539; 361/66; 361/115; 364/483
[58] Field of Search ...................................... 324/512, 521, 324/522, 523, 524, 525, 539, 133; 361/62, 66, 67, 72, 79, 80, 81, 115; 364/481, 483

[56] References Cited

U.S. PATENT DOCUMENTS

| | | | |
|---|---|---|---|
| 3,878,460 | 4/1975 | Nimmersjo | 324/520 |
| 4,251,766 | 2/1981 | Souillard | 324/521 |
| 4,351,011 | 9/1982 | Liberman | 361/82 |
| 4,352,137 | 9/1982 | Johns | 324/522 X |
| 4,371,907 | 2/1983 | Bignell | 361/82 |
| 4,560,922 | 12/1985 | Heller et al. | 324/521 |
| 4,731,688 | 3/1988 | Nimmersjo et al. | 361/65 |
| 4,731,689 | 3/1988 | Nimmersjo et al. | 361/66 |
| 4,797,805 | 1/1989 | Nimmersjo | 364/481 |
| 4,922,368 | 5/1990 | Johns | 361/62 |

Primary Examiner—Kenneth A. Wieder
Assistant Examiner—Glenn W. Brown
Attorney, Agent, or Firm—Watson Cole Stevens Davis, PLLC

[57] ABSTRACT

A method and a device for determining the direction to a fault on a power transmission line in relation to a measuring station with the aid of phase currents and voltages, measured in the measuring station, by means of which change values ΔU in the phase voltage, change values in the phase voltage ΔUM of a line model and change values in the derivative ΔI' of the phase current can be determined, and wherein for each measuring loop phase-ground the signal ΔQL=(ΔU−ΔUM)·ΔUI' is formed and if this value is smaller than a negative value assumed in advance, a fault lying ahead, in relation to the measuring station, has been detected, and wherein for each measuring loop phase-ground the signal ΔQB =ΔU·ΔUI' is formed and if this value is greater than a positive value assumed in advance, a fault lying behind, in relation to the measuring station, has been detected.

7 Claims, 1 Drawing Sheet

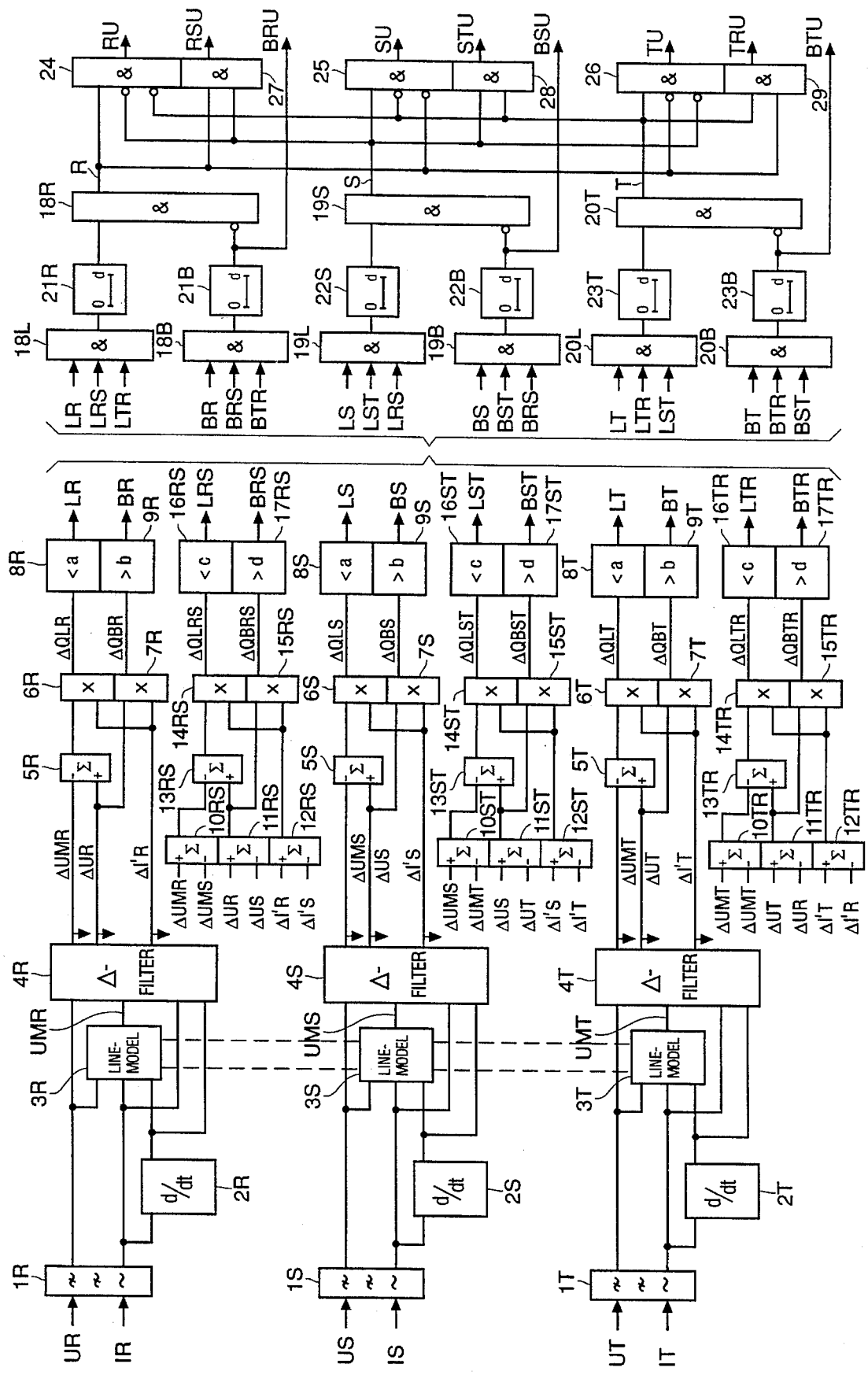

METHOD AND DEVICE FOR DETERMINING THE DIRECTION TO A FAULT ON A POWER TRANSMISSION LINE

TECHNICAL FIELD

It is important to protect components included in power or transmission networks, such as power lines, busbars, transformers, etc. The present invention relates to a method and a device for protection which indicates in which direction, in relation to two or more measuring points, a fault has occurred, a so-called directional detecting protection. In this connection the term "zone of supervision" of a protection device is used, and an internal fault is defined as a fault which lies within the zone of supervision of the protection device. A fault which lies outside the zone of supervision and which can be detected is consequently called an external fault. Starting from a measuring point, directional detection can also be obtained, and in that connection the term "a fault lying ahead" is used when referring to a fault occurring in the direction of supervision of the protection device, and the term "a fault lying behind" is used when referring to a fault occurring in the opposite direction.

BACKGROUND ART

When a fault occurs in a power transmission network, travelling waves arise which move along the line. It is known to use the direction of movement of these travelling waves as a measuring point to determine the direction to the location of the fault.

U.S. Pat. No. 3,878,460 discloses how to utilize the fact that in those travelling waves, which from a fault point move in towards the measuring point of the protection device, the current and voltage waves have different signs. If the voltage is designated "u", the current "i", and the wave impedance $Z_0$, the equation $u=-Z_0 \cdot i$ is obtained in the case of a fault lying ahead. If the fault is located behind the measuring point, the current and voltage waves have the same signs, whereby the equation $u=Z_0 \cdot i$ is obtained for a external fault lying behind. To obtain a measure of the travelling waves, the fundamental frequency parts of the current and voltage signals are here filtered away.

A directional wave detector according to U.S. Pat. No. 4,351,011 (=SE 7803868-4) is using an alternative in which, instead of treating the voltage and current waves separately, the product of voltage and current is formed, that is, the power or its integral, that is, the energy. The direction to a fault can then be determined by the sign of the instantaneous power or energy change. For an internal fault or a fault lying ahead, a negative sign of the power or energy change is then obtained, and, in a corresponding way, a positive sign is obtained for an external fault or a fault lying behind.

Another way of obtaining directional detection of faults on a power line located between two stations P and Q is clear from U.S. Pat. No. 4,731,689. The method is based on the fact that with access to data for a faultless power line, a wave guide model of the power line can be determined. With the aid of the wave model and measured currents and voltages in the stations, the voltage distribution along the power line can be calculated. The direction to a fault is determined by studying locally in a station changes in calculated voltages in the two stations. If a fault occurs between the stations, the voltage change in station Q between the voltage prior to the fault and after the fault may be calculated, with the wave model, to be $|\Delta Uq|$ and the corresponding voltage change in station P may be calculated to be $|\Delta Up|$, and if $|\Delta Uq|-$ $|\Delta Up|>0$ this means that there is a fault on the line side of station P, that is, a fault lying ahead.

To be able to carry out the directional determination according to the invention, access is also needed to the corresponding change values or $\Delta$-values for both voltage and current. Several alternative methods are available for obtaining these values. One such method is described in the above-mentioned U.S. Pat. No. 4,731,689 in the following way: $\Delta$-values ". . . are obtained by adding the (voltage) values of two consecutive half-periods". Another alternative is to take the difference between the value in question and a value one period earlier. The generation of these $\Delta$-values will take placed, according to the description, in a so-called $\Delta$-filter.

In addition, it is necessary to have access to some model of the line which describes its properties. Also in this case there are several more or,less complete models which take the line data into account. One such model may, for example, be:

$$UM = R \cdot I + L \cdot I' + Rn \cdot In + Ln \cdot In'$$

Here, UM designates a model phase voltage, R designates the resistance of the line, I is the phase current, L is the inductance of the line, I' is the derivative of the phase current, Rn is the resistance of the ground loop, In is the ground current, Ln is the inductance of the ground loop, and In' is the derivative of the ground current. The formation of the phase voltages of the line model will be carried out, according to the following description, in a so-called "Line model".

SUMMARY OF THE INVENTION ADVANTAGES

The principle of determining the direction to a fault on a power transmission line according to the invention will be described partly for directional determination in case of a fault in one phase and partly for directional determination in case of a phase-to-phase fault.

The condition is that: the phase voltage U, the phase current I, the derivative I' of the phase current and, via a line model, the model voltage UM are obtained, and that change values can be determined, via a $\Delta$-filter, for these quantities, that is, $\Delta U$, $\Delta UM$ and $\Delta I'$ for each measuring loop R-ground, S-ground, T-ground, R-S, S-T, and T-R.

By forming the difference $\Delta U - \Delta UM$ for each measuring loop phase-ground and multiplying this difference by $\Delta I'$, a signal $\Delta QL$ is obtained. If the value of this signal, when a fault has been detected, is smaller than a negative value assumed in advance, this means that there is a fault "L" lying ahead, in relation to the measuring station, on the line and that, together with the other criteria for tripping, the phase or phases in question may be disconnected.

By multiplying $\Delta U$ by $\Delta I'$ for each measuring loop, a signal $\Delta QB$ is obtained. If the value of this signal, when a fault has been detected, is greater than a positive value assumed in advance, this means that there is a fault "B" lying behind, in relation to the measuring station, on the line and that disconnection of the phase or phases in question can be blocked.

For a phase-to-phase fault, the differences between the $\Delta$-values for the different phase-ground measuring loops can be formed, and, in the same way as above, $\Delta QL$-values and $\Delta QB$-values may be obtained for the phase-to-phase faults described above.

A more detailed explanation of the method will become clear from the following description of embodiments.

The method for directional determination according to U.S. Pat. No. 4,351,011 mentioned above is based on the sign of the instantaneous power change, that is $\Delta I \cdot \Delta U$. Because the impedances in a power network are preferably inductive, the relationship between the current and voltage changes in the event of a fault will be determined by this fact. A more detailed study of the polarity of the current and voltage changes under these conditions shows that they have different signs during the first few milliseconds after the occurrence of a fault. Thereafter, however, the current and voltage changes will have the same polarity. Admittedly, this method provides the correct direction to the fault during the first few milliseconds, but because after this time they have the same polarity, problems may arise.

Further studies have shown that a distinct and unambiguous negative sign of the product $\Delta I' \cdot \Delta U$ is obtained since the polarities of these two factors remain different after the occurrence of a fault. The advantage of using this criterion for directional determination etc. is thus that the described uncertainty of prior art methods has been eliminated.

DESCRIPTION OF THE PREFERRED EMBODIMENTS

A complete embodiment of the method according to the invention for the three phases of a power transmission network will be described with reference to the accompanying figure.

According to the invention, $\Delta$-values $\Delta U$, $\Delta UM$ and $\Delta I'$ are formed for each measuring loop according to the above, that is $\Delta UR$, $\Delta UMR$, $\Delta I'R$ and $\Delta US$, $\Delta UMS$, $\Delta I'S$ and $\Delta UT$, $\Delta UMT$, $\Delta I'T$ on the basis of phase voltages and currents UR, IR, US, IS, UT and IT via low-pass filters IR, IS and IT, current differentiators 2R, 2S and 2T, line models 3R, 3S and 3T and $\Delta$-filters 4R, 4S and 4T. It should be pointed out here that the figure, in order to become more clear, is somewhat simplified as regards the line models. As will be clear from the above-described line model, the ground current In and its derivative In' are included. These quantities are formed in the simplest way by summing the phase currents and the derivatives of the phase currents, respectively. Therefore, in a complete diagram there are connections between the three line models, which is indicated in the figure by the dashed lines between the line models. Otherwise, it is assumed here that the line models are provided with the current network data according to the description under the "Background Art" above.

In accordance with the description of the invention, $\Delta QLR$, $\Delta QBR$, $\Delta QLS$, $\Delta QBS$, $\Delta QLT$ and $\Delta QBT$ are formed with the aid of the summators 5R, 5S and 5T, the multipliers 6R, 6S and 6T and the multipliers 7R, 7S and 7T as $$\Delta QLR=(\Delta UR-\Delta UMR)\cdot \Delta I'R$$

$$\Delta QBR=\Delta UR \cdot \Delta I'R$$

$$\Delta QLS=(\Delta US-\Delta UMS)\cdot \Delta I'S$$

$$\Delta QBS=\Delta US \cdot \Delta I'S$$

$$\Delta QLT=(\Delta UT-\Delta UMT)\cdot \Delta I'T$$

$$\Delta QBT=\Delta UT \cdot \Delta I'T$$

In the comparators 8R, 8S and 8T the respective $\Delta QL$-values are then compared with a negative constant "a" assumed in advance, and if one or more of the $\Delta QL$-values after a fault has been detected is/are smaller than "a", a logical "1" is obtained, designated LR, LS and LT, respectively. The significance of these signals is that there is a fault lying ahead in one phase, in several phases, or in all phases.

In parallel therewith, the respective $\Delta QB$-values are compared in the comparators 9R, 9S and 9T with a positive constant "b" assumed in advance, and if one or more of the $\Delta QB$-values after a fault has been detected is/are greater than "b", a logical "1" is obtained, designated BR, BS and BT, respectively. The significance of these signals is that there is a fault lying behind in one phase, in several phases, or in all the phases and that disconnection of the faulty phase or phases can be blocked by means of the signals.

The most frequent fault in a power network is a single-phase ground fault. In certain safety engineering applications, however, it is desirable to obtain information whether there is a fault in only one of the phases and in which phase the fault has occurred. When multi-phase faults occur, it is also desirable to be able to identify which phases are involved. The embodiment described above for information about faults lying ahead and faults lying behind can also be used to satisfy these purposes. This can be done with the aid of the $\Delta$-values described. For this purpose, the $\Delta$-signals for the phase-to-phase measuring loops according to the above are needed, that is, $\Delta URS$ corresponding to the difference between $\Delta UR$ and $\Delta US$, and in similar manner the differences $\Delta UMRS$, $\Delta I'RS$, $\Delta UST$, $\Delta UMST$, $\Delta I'ST$, $\Delta UTR$, $\Delta UMTR$ and $\Delta I'TR$. These signals are formed with the aid of the summators 10RS, 11RS, 12RS, 10ST, 11ST, 12ST, 10TR, 11TR and 12TR.

In similar manner as described above, $\Delta QLRS$, $\Delta QBRS$, $\Delta QLST$, $\Delta QBST$, $\Delta QLTR$ and $\Delta QBTR$ are formed with the aid of the summators 13RS, 13ST and 13TR, the multipliers 14RS, 14ST and 14TR, and the multipliers 15RS, 15ST and 15TR as $$\Delta QLRS=((\Delta UR-\Delta US)-(\Delta UMR-\Delta UMS))\cdot(\Delta I'R-\Delta I'S)$$

$$\Delta QBRS=(\Delta UR-\Delta US)\cdot(\Delta I'R-\Delta I'S)$$

$$\Delta QLST=((\Delta US-\Delta UT)-(\Delta UMS-\Delta UMT))\cdot(\Delta I'S-\Delta I'T)$$

$$\Delta QBST=(\Delta US-\Delta UT)\cdot(\Delta I'S-\Delta I'T)$$

$$\Delta QLTR=((\Delta UT-\Delta UR)-(\Delta UMT-\Delta UMR))\cdot(\Delta I'T-\Delta I'R)$$

$$\Delta QBTR=(\Delta UT-\Delta UR)\cdot(\Delta I'T-\Delta I'R)$$

In the comparators 16RS, 16ST and 16TR, the $\Delta QL$-values are then compared with a negative constant "c" assumed in advance, and if one or more of the $\Delta QL$-values after a fault has been detected is/are smaller than "c", a logical "1" is obtained, designated LRS LST and LTR.

In parallel therewith, the respective $\Delta QB$-values are compared in the comparators 17RS, 17ST and 17TR with a positive constant "d" assumed in advance, and if one or more of the $\Delta QB$-values after a fault has been detected is/are greater than "d", a logical "1" is obtained, designated BRS, BST and BTR, respectively.

With the signals obtained in the above manner, it is possible, via a Boolean arrangement, for example as is clear from the figure with the "AND" elements 18L, 18B and 18R, 19L, 19B and 19S, 20L, 20B and 20T, to form the signals $$R=LR \cdot LRS \cdot LTR \cdot \overline{(BR \cdot BRS \cdot BTR)}$$

$$S=LS \cdot LST \cdot LRS \cdot \overline{(BS \cdot BST \cdot BRS)}$$

$$T=LT \cdot LTR \cdot LST \cdot \overline{(BT \cdot BTR \cdot BST)}$$

To ensure the formation of the above signals, it may be suitable to introduce the time-lag elements 21R and 21B, 22S and 22B, 23T and 23B as will be clear from the figure.

Now, thus, the necessary signals are available for identifying single-phase faults to ground, lying ahead, for all phases as well as for identifying multi-phase faults. A suitable method therefor can also be executed with a Boolean arrangement with "AND" elements 24, 25 and 26 executing the Boolean expressions $$RU = R \cdot \bar{S} \cdot \bar{T}$$

$$SU = S \cdot \bar{R} \cdot \bar{T}$$

$$TU = T \cdot \bar{R} \cdot \bar{S}$$

The signal RU thus indicates that a fault which has occurred is a single-phase fault to ground, lying ahead, in the R-phase, SU correspondingly indicates a single-phase fault to ground I, lying ahead, in the S-phase and TU correspondingly indicates a fault lying ahead in the T-phase.

The indication of multi-phase faults may be derived with the aid of the "AND" elements 27, 28 and 29 executing the Boolean expressions:

$$RSU = R \cdot S$$

$$STU = S \cdot T$$

$$TRU = T \cdot R$$

where the signal RSU indicates only a fault lying ahead in the phases R and S, the signal STU only a fault lying ahead in the phases S and T, and the signal TRU only a fault lying ahead in the phases T and R.

In a corresponding manner, information as to the occurrence of a fault lying behind in any individual phase may be obtained. Such a signal BRU for the R-phase is directly available in the figure as the signal after the time-lag element 21B, that is, $$BRU = BR \cdot BRS \cdot BTR$$

which means that the phase R has a fault laying behind. The corresponding signal BSU for the S-phase is directly available in the figure as the signal 22B, that is, $$BSU = BS \cdot BST \cdot BRS$$

which means that the phase S has a fault lying behind.

The corresponding signal BTU for the 3-phase is directly available in the figure as the signal after the time-lag element 22B, that is, $$BTU = BT \cdot BTR \cdot BST$$

which means that the phase T has a fault lying behind.

As an example of a logic circuit, it can be seen that, in the case of a single-phase fault R to ground, only the signals LR, LRS and LTR will consist of "1" (ones) whereas all the other signals or at least LST are "0" (zero). This means that the signal R becomes "1" (one) whereas the signals S and T become "0" (zeros). This then means that only the signal RU becomes a "1" (one) indicating a ground fault in the R-phase lying ahead.

In case of a two-phase fault R-S the signals LR, LRS, LTR, LS and LST will consist of "1" (ones) whereas in most cases all other signals are "0" (zeros). This means that the signals R and S become "1" (ones) whereas T becomes "0" (zero) which in turn means that all RU, SU, TU and STU as well as TRU become "0" (zeros) whereas RSU becomes a "1" (one) that is, a fault lying ahead in the R- and S-phases.

In a complete line protection system, there are three different functions which are influenced by the signals produced above, namely, for the directional comparison, for the selection of measuring loop, and for phase selection for tripping circuit breakers.

The numerical values of the constants a, b, c and d are determined partly on the basis of the ratings of the current and voltage transformers which are used, partly depending on how sensitive the protection device is to be, and partly depending on whether it is a power network with considerable harmonics. If, for example, the secondary data of the used current transformers are 110 volts and 1 ampere, then "a" should lie within the range 0.5–12; preferably a=6.5

"b" should lie within the range 0.25–5; preferably b=2.5

"c" should lie within the range 1–22; preferably c=11

"d" should lie within the range 0.5–10; preferably d=4.5.

The scope of the invention comprises different embodiments which may consist of separate units as described above, or more or less integrated, possibly program-controlled embodiments.

I claim:

1. A method for determining the direction to a fault on a power transmission line relative to a measuring station for measuring the phase currents IR, IS, IT and the phase voltages UR, US and UT of the power transmission line, comprising, for each phase of the! power transmission line, the steps of:

determining the derivative (I') of the phase current (I);

determining a model voltage (UM) of the power transmission line from a predetermined line model;

determining the phase change current ($\Delta$I') in the measured phase current (I), the phase change voltage ($\Delta$U) in the phase voltage (U) and the phase change model voltage ($\Delta$UM) in the model voltage (UM);

summing the phase change voltage ($\Delta$U) and the phase change model voltage ($\Delta$UM) to form the phase difference voltage ($\Delta$U–$\Delta$UM);

multiplying the phase difference voltage ($\Delta$U–$\Delta$UM) by the phase change current ($\Delta$I') to form a signal ($\Delta$QL) and multiplying the phase change voltage ($\Delta$U) by the derivative phase charge current ($\Delta$I') to form a signal ($\Delta$QB);

comparing signal ($\Delta$QL) with an assumed negative constant and if ($\Delta$QL) is smaller than said negative constant generating a signal (L) that a fault lies ahead relative to the measuring station;

comparing ($\Delta$QB) with an assumed positive value and if ($\Delta$QB) is greater than said positive constant, generating a signal (B) that a fault lies behind relative to the measuring station;

the previous steps generating: signals LR and BR, LS and BS and LT and BT for the respective phases R,S and T of the power transmission line; and at least one of disconnecting and blocking the faulty phase or phases using signals LR, BR, LS, BS, LT and BT.

2. A method for determining the direction to a fault on a power transmission line according to claim 1, wherein the model voltage UM per phase is formed with the aid of a line model $$UM = R \cdot I + L \cdot I' + Rn \cdot In + Ln \cdot In'$$

wherein R denotes the resistance of the line, I is the phase current, L is the inductance of the line, I' is the derivative of the phase current, Rn is the resistance of the ground loop, In is the ground current, In' is the derivative of the ground current, and Ln is the inductance of the ground loop.

3. A method according to claim 1, further comprising, for each phase of the power transmission line, the steps of:

determining the difference between the measured change current ($\Delta I'$) in the phase current of two adjacent phases to obtain a difference phase current;

determining the difference between the measured phase change voltage in the phase voltage of said two adjacent phases to obtain a difference phase voltage;

determining the difference between the change in the phase model voltage of said two adjacent phases to obtain a difference model phase voltage;

determining the difference between said difference phase model voltage and said difference phase voltage to obtain a difference signal;

multiplying said difference signal by said difference phase current to obtain a signal ($\Delta QL'$);

multiplying said difference phase voltage signal by said difference phase current signal to obtain a signal ($\Delta QB'$);

comparing said signal ($\Delta QL'$) with an assumed second negative constant and if signal ($\Delta QL'$) is smaller than said second negative constant, providing a signal (L') indicative thereof; and comparing signal ($\Delta QB'$) with an assumed second positive constant and if signal ($\Delta QB'$) is greater than said second positive constant, providing a signal (B') indicative thereof;

the previous steps generating signals LR, LRS, LTR, BR, BRS and BTR in phase R, signals LS, LST, LRS, BS, BST and BRS in phase S and signals LT, LTR, LST, BT, BTR and BST in phase T of the power transmission line, said signals being determinative of single-phase faults to ground occurring ahead and behind the measuring station and multi-phase faults occurring ahead and behind the measuring station.

4. A method according to claim 3, further comprising, for each phase of the power transmission line, further comprising the steps of:

inputting signals LR, LRS and LTR into a first AND gate and inputting signals BR, BRS and BTR into a second AND gate to produce an output signal BRU;

inputting the respective outputs of said first and second AND gates into a third AND gate to produce a signal (R)

inputting signals LS, LST and LRS into a fourth AND gate and inputting signals BS, BST and BRS into a fifth AND gate to produce an output signal BSU;

inputting the respective outputs of said fourth and fifth AND gates into a sixth AND gate to produce a signal (S);

inputting signals LT, LTR and LST into a seventh AND gate and inputting signals BT, BTR and BST into an eighth AND gate to produce an output signal BTU;

inputting the respective outputs of said seventh and eighth AND gates into a ninth AND gate to produce a signal (T);

inputting signals (R), (S) and (T) into a tenth AND gate to produce an output signal RU;

inputting signals (R) and (S) into an eleventh AND gate to generate a output signal RSU;

inputting signals (R), (S) and (T) into a twelve AND gate to produce an output signal SU;

inputting signals (S) and (T) into a thirteenth AND gate to produce an output signal STU;

inputting signals (R), (S) and (T) into a fourteenth AND gate to produce an output signal TU;

inputting signals (R) and (T) into a fifteenth AND gate to produce an output signal TRU;

said output signal RU indicating a single-phase fault to ground in the phase R and lying ahead of the measuring station; said output signal SU indicating a single-phase fault to ground in the phase S and lying ahead of the measuring station; said output signal TU indicating a single-phase fault to ground in the T phase and lying ahead of the measuring station; said output signal RSU indicating a fault in phases R and S and lying ahead of the measuring station; said output signal STU indicating a fault in phases S and T and lying ahead of the measuring station; said output signal TRU indicating a fault in phases T and R and lying ahead of the measuring station; output signals BRU, BSU and BTU respectively indicate a fault in phases R, S and T and lying behind the measuring station.

5. Apparatus for determining the direction to a fault on a power transmission line relative to a measuring station for measuring the phase currents IR, IS, IT and the phase voltages UR, US and UT of the power transmission line, comprising, for each phase of the power transmission line:

means for forming the derivative I' of the phase current;

means for forming a model voltage UM of the power transmission line from a line model;

means for determining the change values $\Delta I'$ in the measured phase current I, $\Delta U$ in the phase voltage U and $\Delta UM$ in the model voltage UM;

means for summing the change values $\Delta U$ and $\Delta UM$ to form the difference ($\Delta U - \Delta UM$);

means for multiplying ($\Delta U - \Delta UM$) by $\Delta I'$ to form a signal $\Delta QL$ and multiplying $\Delta U$ by $\Delta I'$ to form a signal $\Delta QB$;

means for comparing $\Delta QL$ with an assumed negative value and if $\Delta QL$ is smaller than said negative value, providing a signal that a fault L lies ahead relative to the measuring station;

means for comparing $\Delta QB$ with an assumed positive value and if $\Delta QB$ is greater than said positive value, providing a signal that a fault B lies behind relative to the measuring station; and means for at least disconnecting or blocking the faulty phase or phases.

6. Apparatus according to claim 5, further comprising, for each phase of the power transmission line:

means for determining the difference between the measured change current ($\Delta I'$) in the phase current of two adjacent phases to obtain a difference phase current;

means for determining the difference between the measured phase change voltage in the phase voltage of said two adjacent phases to obtain a difference phase voltage;

means for determining the difference between the change in the phase model voltage of said two adjacent phases to obtain a difference model phase voltage;

means for determining the difference between said difference phase model voltage and said difference phase voltage to obtain a difference signal;

means for multiplying said difference signal by said difference phase current to obtain a signal ($\Delta QL'$);

means for multiplying said difference phase voltage signal by said difference phase current signal to obtain a signal ($\Delta QB'$);

means for comparing said signal (ΔQL') with an assumed negative constant and if signal (ΔQL') is smaller than said negative constant, providing a signal (L') indicative thereof; and means for comparing signal (ΔQB') with an assumed positive constant and if signal (ΔQB') is greater than said positive constant, providing a signal (B') indicative thereof;

the recited means generating signals LR, LRS, LTR, BR, BRS and BTR in phase R, signals LS, LST, LRS, BS, BST and BRS in phase S and signals LT, LTR, LST, BT, BTR and BST in phase T of the power transmission line, said signals being determinative of single-phase faults to ground occurring ahead and behind the measuring station and multi,phase faults occurring ahead and behind the measuring station.

7. Apparatus according to claim 6, further comprising, for each phase of the power transmission line:

a first AND gate for receiving signals LR, LRS and LTR and a second AND gate for receiving signals BR, BRS and BTR to produce an output signal BRU;

a third AND gate for receiving the respective outputs of said first and second AND gates to produce a signal (R)

a fourth AND gate for receiving signals LS, LST and LRS and a fifth AND gate for receiving signals BS, BST and BRS to produce an output signal BSU;

a sixth AND gate for receiving the respective outputs of said fourth and fifth AND gates to produce a signal (S)

a seventh AND gate for receiving signals LT, LTR and LST and an eighth AND gate for receiving signals BT, BTR and BST to produce an output signal BTU;

a ninth AND gate for receiving the respective outputs of said seventh and eighth AND gates to produce a signal (T);

a tenth AND gate for receiving signals (R), (S) and (T) to produce an output signal RU;

an eleventh AND gate for receiving signals (R) and (S) to generate an output signal RSU;

a twelfth AND gate for receiving signals (R), (S) and (T) to produce an output signal SU;

a thirteenth AND gate for receiving signals (S) and (T) to produce an output signal STU;

a fourteenth AND gate for receiving signals (R), (S) and (T) to produce an output signal TU;

a fifteenth AND gate for receiving signals (R) and (T) to produce an output signal TRU;

said output signal RU indicating a single-phase fault to ground in the phase R and lying ahead of the measuring station; said output signal SU indicating a single-phase fault to ground in the phase S and lying ahead of the measuring station; said output signal TU indicating a single-phase fault to ground in the T phase and lying ahead of the measuring station; said output signal RSU indicating a fault in phases R and S and lying ahead of the measuring station; said output signal STU indicating a fault in phases S and T and lying ahead of the measuring station; said output signal TRU indicating a fault in phases T and R and lying ahead of the measuring station; output signals BRU, BSU and BTU respectively indicate a fault in phases R, S and T and lying behind the measuring station.

* * * * *